(12) United States Patent
Takazawa

(10) Patent No.: US 8,603,602 B2
(45) Date of Patent: *Dec. 10, 2013

(54) OPTIONAL DISK AND METHOD FOR MANUFACTURING THE SAME

(71) Applicant: Kabushiki Kaisha Toshiba, Minato-ku (JP)

(72) Inventor: Koji Takazawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,514

(22) Filed: Apr. 1, 2013

(65) Prior Publication Data

US 2013/0216758 A1    Aug. 22, 2013

Related U.S. Application Data

(63) Continuation of application No. 12/727,988, filed on Mar. 19, 2010, now Pat. No. 8,426,002, which is a continuation of application No. 11/725,480, filed on Mar. 20, 2007, now Pat. No. 7,713,609, which is a continuation of application No. 10/849,831, filed on May 21, 2004, now Pat. No. 7,229,679.

(30) Foreign Application Priority Data

Jun. 5, 2003   (JP) ................................. 2003-161037

(51) Int. Cl.
*G11B 7/24* (2013.01)

(52) U.S. Cl.
USPC ..................... 428/64.1; 428/64.4; 430/270.11

(58) Field of Classification Search
USPC ..................... 428/64.4; 430/270.11
See application file for complete search history.

(56) References Cited

U.S. PATENT DOCUMENTS

| 5,681,634 | A | 10/1997 | Miyamoto et al. |
| 5,827,593 | A | 10/1998 | Maruyama et al. |
| 5,848,687 | A | 12/1998 | Shultz |
| 5,851,620 | A | 12/1998 | Nakajima et al. |
| 5,939,162 | A | 8/1999 | Asai |
| 5,997,976 | A | 12/1999 | Mueller et al. |
| 6,083,598 | A | 7/2000 | Ohkubo et al. |
| 6,214,430 | B1 | 4/2001 | Kim et al. |
| 6,500,512 | B2 | 12/2002 | Russell et al. |
| 6,528,138 | B2 | 3/2003 | Meinders et al. |
| 6,576,317 | B2 | 6/2003 | Yoshimura et al. |
| 6,811,851 | B2 | 11/2004 | Tanaka et al. |
| 2001/0024708 | A1 | 9/2001 | Uchida et al. |

FOREIGN PATENT DOCUMENTS

| JP | 9-44906 | 2/1997 |
| JP | 9-138970 | 5/1997 |
| JP | 9-282712 | 10/1997 |
| JP | 2001-256683 | 9/2001 |

*Primary Examiner* — Elizabeth Mulvaney
(74) *Attorney, Agent, or Firm* — Oblon, Spivak, McClelland, Maier & Neustadt, L.L.P.

(57) ABSTRACT

A first substrate is formed to include a surface on which a first record layer is formed, and which includes an inner circumferential portion on which a ring-shaped member is provided. Ultraviolet curing resin is dropped onto part of the surface which is located inward of the ring-shaped member, and the first substrate is then spun to coat the first record layer with the ultraviolet curing resin. Furthermore, a second substrate is formed to include a surface on which a second record layer is formed, and the second substrate is spun to coat the second record layer with ultraviolet curing resin. Then, the first and second record layers are made to face each other, and the first and second substrates are bonded to each other by the ultraviolet curing resin.

1 Claim, 4 Drawing Sheets

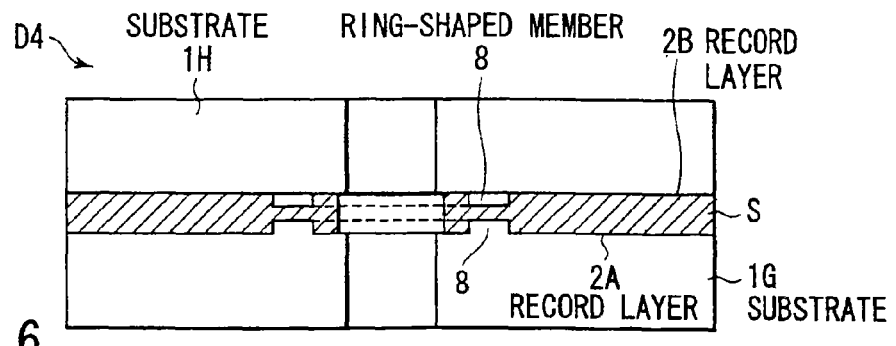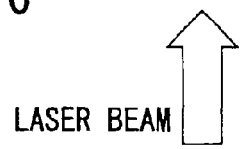
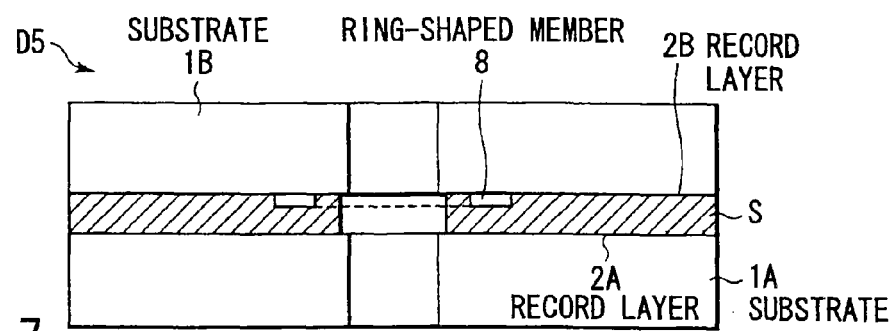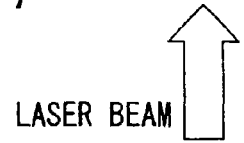
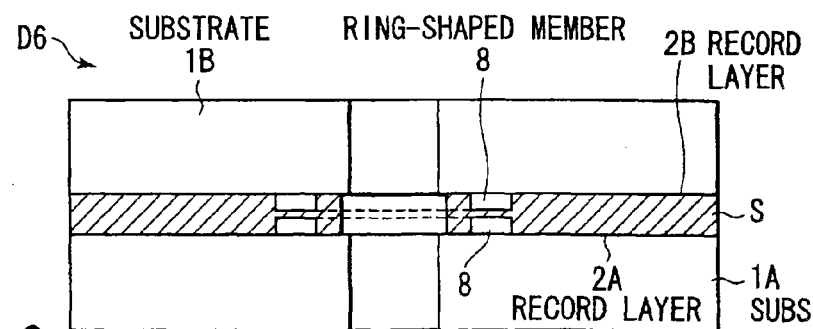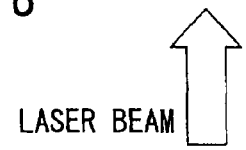

OPTIONAL DISK AND METHOD FOR MANUFACTURING THE SAME

CROSS-REFERENCE TO RELATED APPLICATIONS

This application is a continuation application of U.S. Ser. No. 12/727,988, filed Mar. 19, 2011, which is a continuation application of U.S. Ser. No. 11/725,480, filed Mar. 20, 2007, which is a continuation application of U.S. Ser. No. 10/849,831, filed May 21, 2004, which claims priority under 35 U.S.C. 119(a)-(d) to Japanese Patent Application No. 2003-161037, filed Jun. 5, 2003, the entire contents of all of which are incorporated herein by reference.

BACKGROUND OF THE INVENTION

1. Field of the Invention

The present invention relates to an optical disk which includes a plurality of information record layers, and allows information to be recorded/reproduced on/from the information record layers with a laser beam.

2. Description of the Related Art

In recent years, information in optical disks has been recorded at a higher density. As a result, pits or grooves formed in optical disks have been required to be formed at a higher density. Furthermore, e.g., Jpn. Pat. Appln. KOKAI Publication No. 9-138970 discloses a multi-layer optical disk which has a plurality of layers having pits or grooves, and allows information to be optically read from one side of the optical disk.

For example, a dual-layer optical disk is provided as the multi-layer optical disk. One of the both sides of the dual-layer optical disk has a first substrate on which a first information record layer is formed, and the other has a second substrate on which a second information record layer is formed. The first and second information record layers are provided opposite to each other, and bonded to each other by a transparent ultraviolet curing resin. Each of the above information record layers is a phase change record layer which enables information to be recorded therein by utilizing a phase change occurring due to irradiation of a laser beam, or a read-only reflection layer having a surface which is formed to have pits representing information.

By way of example, a conventional method of bonding substrates by performing spin-coating will be explained.

In the conventional method, ultraviolet curing type resin is dropped onto an information record layer of a substrate such that it is ring-shaped coaxial with the substrate. It is spun for a predetermined time period to coat the substrate such that the surplus part of the ultraviolet curing type resin is removed from the substrate, as a result of which the ultraviolet curing type resin is provided to have a predetermined thickness. After preparing two substrate coated with ultraviolet currying type resin in such a manner, the following steps are carried out: the surfaces of the substrates which are coated with the ultraviolet curing type resin are made to face each other; the centers of the substrates are put together by using a center pin; the substrates are bonded together in a vacuum; and ultraviolet rays are radiated onto the substrates for a predetermined time period, thereby curing the ultraviolet curing type resin. As a result, a spacer layer (adhesive layer) having a predetermined thickness is provided.

However, when a spacer layer is formed by the above spin-coating method, part of the spacer layer which is located on an inner circumferential part of a disk tends to be thin, since the ultraviolet curing type resin has viscosity and the position onto which the resin can be dropped is limited to a specific position. In dual-layer DVD-ROMs currently on the market, a problem such as a malfunction does not occur, even when the spacer layer on the inner and outer circumferential portions of the disk is uneven in thickness. This is because an optical pickup is optimally designed.

In recent years, dual-layer optical disks containing information recorded at a higher density has been made, by adopting a method of increasing the NA of a laser beam for recording/reproducing to decrease the diameter of the laser beam. As such a dual-layer optical disk, if a dual-layer optical disk including a spacer layer having a non-uniform thickness is adopted, a serious problem such as a focus error or crosstalk occurring between layers arises.

Consequently, the recording/reproducing characteristics and reliability of the optical disk remarkably lowers.

In order to the above problems, the following method is tried: a spacer layer is formed of an adhesive sheet having a uniform thickness such that the spacer layer is uniformly formed in thickness over the entire surface of a dual-layer optical disk. However, this method requires a new step of removing a separator attached to the adhesive sheet, during a step of bonding substrates together. Furthermore, if the step of removing the separator from the adhesive sheet is carried out for a short time period, there is a strong possibility that the record layer may be damaged by a mechanical stress acting when the separator is removed from the adhesive sheet. On the other hand, if the step of removing the separator is carried out for a long time period, the productivity of optical disks lowers.

Furthermore, it can be considered that in manufacturing light-transmissivesive substrates, the thicknesses thereof are strictly managed to reduce the variance in thickness between the transmissive-light substrates, thereby compensating for the unevenness of the spacer. However, this method also lowers the yield, and remarkably lower the productivity.

BRIEF SUMMARY OF THE INVENTION

An optical disk according to an embodiment of the present invention comprises: a first substrate including a first surface on which a first record layer is provided; a second substrate including a second surface on which a second record layer, and which includes a non-record region on which a ring-shaped member is formed, the non-record region being located inward of a predetermined radius; and a light-transmissive spacer layer. The first and second record layers are provided opposite to each other, and the space between the first and second record layers is filled with the spacer layer.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a cross-sectional view of an optical disk according to the fourth embodiment of the present invention.

FIG. 7 is a cross-sectional view of an optical disk according to the fifth embodiment of the present invention.

FIG. 8 is a cross-sectional view of an optical disk according to the sixth embodiment of the present invention.

DETAILED DESCRIPTION OF THE INVENTION

The embodiments of the present invention will be explained with reference to the accompanying drawings.

Figure 1:
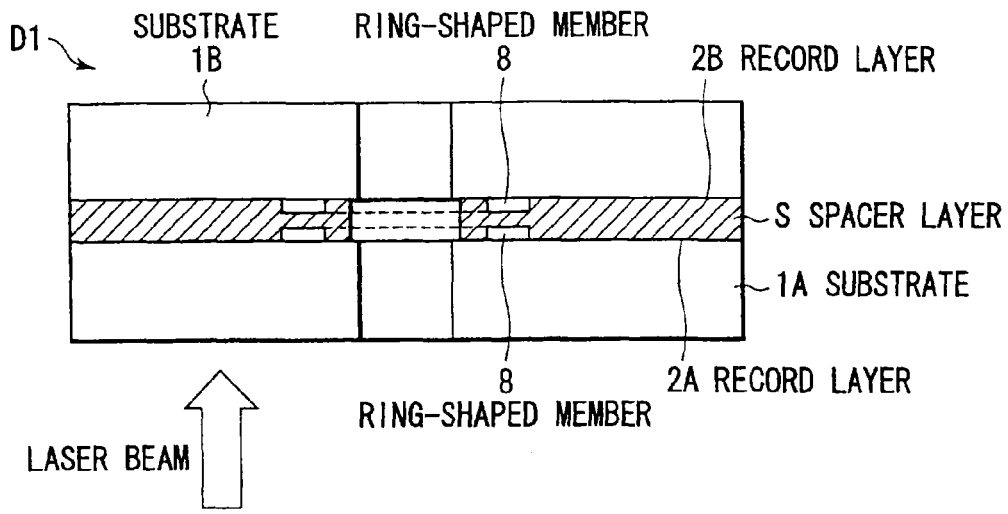
FIG. 1 is a cross-sectional view of an optical disk according to the first embodiment of the present invention.

FIG. 1 is a view showing a cross section of an optical disk according to the first embodiment of the present invention.

Figure 2:
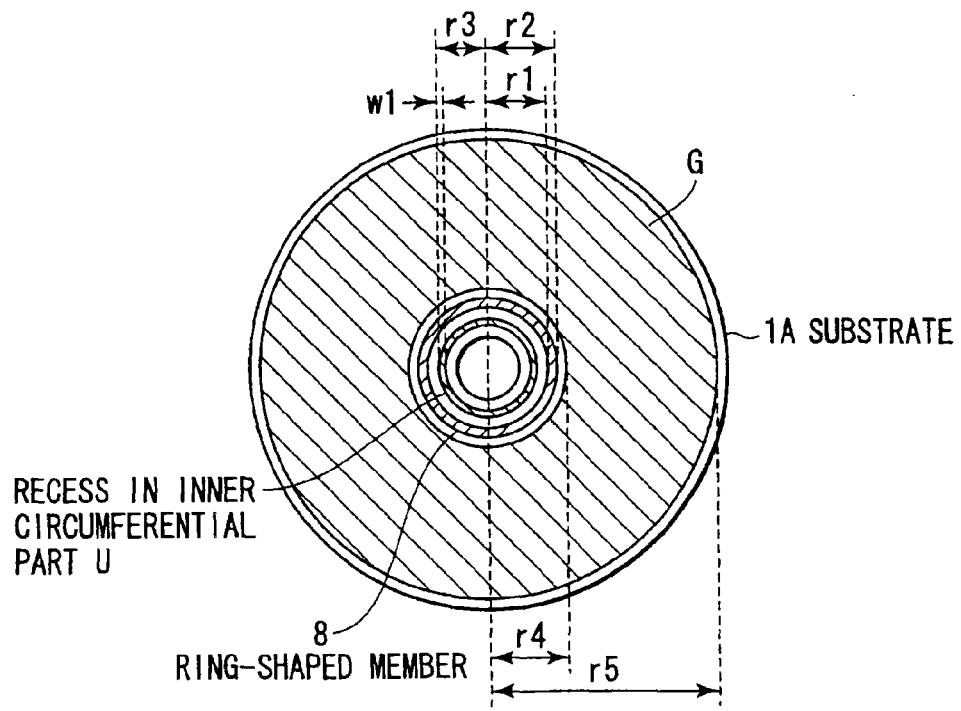
FIG. 2 is a plan view of the optical disk according to the first embodiment of the present invention.

According to the first embodiment of the present invention, a dual-layer optical disk D1 was formed to comprise substrates 1A and 1B bonded together by a spacer layer S. On the substrate 1A, a record layer 2A was formed. On the other hand, on an inner circumferential portion of the substrate 1A, a ring-shaped member (projection) 8 was provided. On the substrate 1B, a record layer 2B was formed. On an inner circumferential portion of the substrate 1B, a ring-shaped member 8 was provided. These record layers were phase change record layers which allowed information to be recorded/reproduced on/from the record layers with irradiation of a laser beam. The ring-shaped member, as shown in FIG. 2, was formed of resin to have a height of 3 μm, and also have an inner radius r1 of, e.g., 14 mm and an outer radius r2 of, e.g., 19 mm.

The method for manufacturing an optical disk, according to the present invention, will be explained in detail.
(Formation of record layers)

First, a transparent substrate (formed of polycarbonate and having a diameter of 120 mm and a thickness of 0.6 mm) 1A including a recess U having a radius of 11 mm (r3), a width of 1 mm (W1) and a depth of 0.2 mm was prepared. The substrate 1A included a region G having an inner radius r4 of 20 mm and an outer radius r5 of 58 mm. In the region G, a groove was spirally formed to contain information. To be more specific, the groove extended in a wobbling manner to indicate addresses or like as the above information. The substrate 1B was formed in the same manner as the substrate 1A, except that it contained information different from that in the substrate 1A.

Then, a record layer 2A was formed on the substrate 1A by use of a magnetron sputtering apparatus using Ar plasma. In the same manner, a record layer 2B was formed on the substrate 1B. In this case, the record layer 2A comprised a dielectric protection film formed of ZnS and SiO2, a phase change material film formed of GeSbTe alloy, a dielectric protection film identical to the former dielectric protection film and a metal reflection film formed of AlMo alloy. In the record layer 1A, the dielectric film, the phase change material film, the dielectric protection film and the metal reflection film were formed in this order from a substrate 1A-side. Also, the record layer 2B comprised a metal reflection film formed of AlMo alloy, a dielectric film formed of ZnS and SiO2, a phase change material film formed of GeSbTe alloy and a dielectric protection film identical to the former dielectric protection film. In the record layer 2B, the metal reflection film, the dielectric film, the phase change material film and the dielectric protection film were formed in this order from the substrate 1B-side. It should be noted that the composition of the phase change material film was set such that the phase change material film had good recording, erasing and repeat recording/reproducing characteristics for a laser beam having a wavelength of 405 nm and the difference in reflectivity between its crystal phase and amorphous phase was great. Also, the composition of the metal reflection film was set in such a manner as to improve the reflectivity of a phase change optical disk.

Furthermore, in order to form the record layers, an inner circumferential mask having an outside diameter of 36 mm was used, and an outer circumferential mask having an inside diameter of 119 mm was used. This was intended to provide a larger recording region in order to increase the capacity of the disk as much as possible.
(Formation of ring-shaped members)

Ring-shaped members 8 were formed of polymethyl methacrylate (PMMA), on the substrate 1A on which the record layer 1A was formed and the substrate 1B on which the record layer 1B was formed, respectively. To be more specific, part of the substrate 1A which had an inner radius r1 of 14 mm and an outer radius r2 of 19 mm was coated with a triene solution containing PMMA dissolved at 5 wt % by weight, such that the triene solution was ring-shaped coaxial with the substrate 1A. When the heights of the ring-shaped members 8 were measured by a surface step-height measuring device, their average height was 3 μm. The region G having the inner radius r4 and the outer radius R5 was a record region in which the groove was formed. A region of the substrate 1A which was located continuous with and inward of the part corresponding to the radius R4 was a non-record region. The ring-shaped member 8 is provided in the non-record region as shown in FIG. 2.
(Bonding of the substrates)

The substrate 1A on which the record layer 2A was formed and the substrate 1B on which the record layer 2B was formed were coated with ultraviolet curing type resin in the following manner: ultraviolet curing type resin was dropped onto part of the substrate 1A which corresponded to a radius of 12 mm (which was located between the recess of inner circumferential part of the substrate and the ring-shaped member) and part of the substrate 1B which corresponded to a radius of 12 mm (which was located between the recess of the inner circumferential part of the substrate and the ring-shaped member) such that the ultraviolet curing type resin was located coaxial with the substrate 1A or 1B. Then, each substrate was spun at 8000 rpm during three seconds, such that the surplus part of the ultraviolet curing type resin was removed from each substrate. The substrates 1A and 1B which were coated with the ultraviolet curing type resin was made to face each other. Then, the centers of the substrates 1A and 1B were put together by using a center pin, and these substrates were bonded while being kept parallel with each other. Thereafter, ultraviolet rays were radiated onto the substrates for a predetermined time period, thereby curing the ultraviolet curing type resin.

When the thickness of the spacer S (i.e., the distance between the record layers 2A and 2B) over the entire signal read region (record region G) of the substrate 1A and 1B was measured, it was 20 μm±1 μm.

Figure 3A:
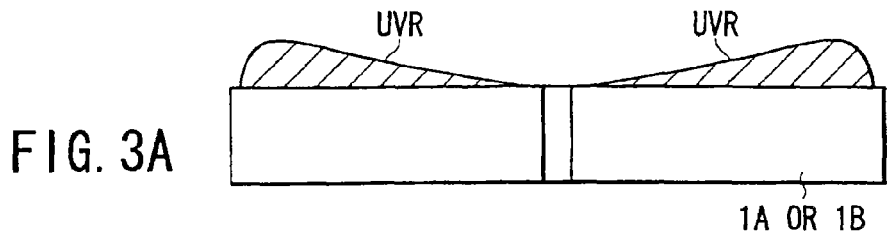
FIGS. 3A and 3B are explanatory views illustrating spin-coating of ultraviolet curing type resin UVR.

FIG. 3A is a view illustrating spin-coating of ultraviolet curing type resin in a conventional method. In order that it be clearly understood, the thickness of the ultraviolet curing type resin is exaggerated in FIG. 3A. In the conventional method shown in FIG. 3A, the thickness of part of ultraviolet curing type resin UVR which is located on an outer circumferential part of the disk is greater than that of part of the ultraviolet curing type resin UVR which is located on an inner circumferential part of the disk. This is because ultraviolet curing type resin UVR dropped onto the inner circumferential portion of the disk is spread by a centrifugal force, and then the greater part of the ultraviolet curing type resin UVR shifts to the outer circumferential part of the disk when the entire surface of the disk is coated with the UVR.

Figure 3B:
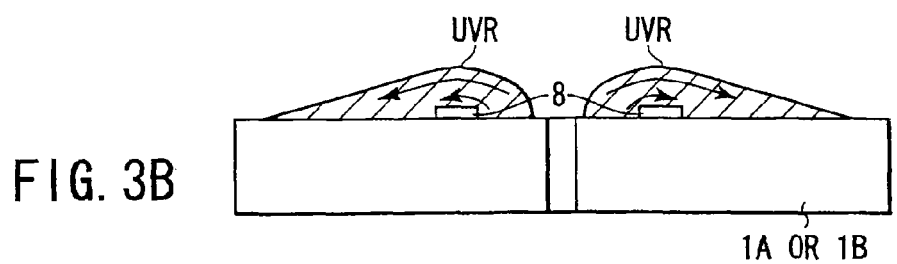

FIG. 3B illustrates spin-coating in the present invention. In the present invention, ultraviolet curing type resin UVR dropped onto part of the disk which is located inward of the ring-shaped member 8 is spread toward an outer circumferential part of the disk by a centrifugal force. At this time, part of the ultraviolet curing type resin UVR which is very close to the ring-shaped member 8 moves slowly. This is because the ring-shaped member 8 obstructs movement of the ultraviolet curing type resin UVR, since the ultraviolet curing type resin UVR has viscosity. Accordingly, during spin-coating, part of ultraviolet curing type resin UVR which is located in close vicinity of the ring-shaped member 8 stays, i.e., it does not shift toward the outer circumferential part of the disk. This structural feature prevents occurrence of the above problem of the conventional method, in which the greater part of the UVR shifts to the outer circumferential part of the disk. As a result, the part of the UVR which is located on the inner circumferential part of the disk is prevented from being too thinned.

It is appropriate that the width (r2–r1) of the ring-shaped member 8 falls within the range of 2 to 8 mm, in view of the range of the viscosity of the ultraviolet curing type resin which is measured before curing, the easiness of spin-coating and an experimental result.

Next, the second embodiment of the present invention will be explained.

Figure 4:
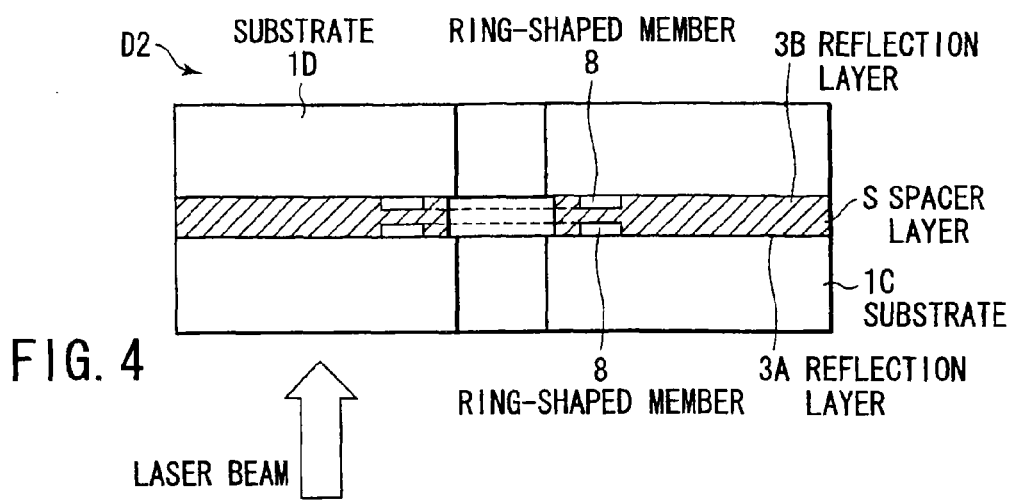
FIG. 4 is a cross-sectional view of an optical disk according to the second embodiment of the present invention.

FIG. 4 is an explanatory view showing a cross section of an optical disk D2 according to the second embodiment of the present invention. The optical disk D2 is a disk-ROM, for example.

(Formation of reflection films)

First, a transparent substrate 1C (formed of polycarbonate and having a diameter of 120 mm and a thickness of 0.6 mm) which had a recess having an outside diameter of 22 mm, a width of 1 mm and a depth of 0.2 mm was prepared. In part of the substrate 1C which had an inner radius of 20 mm and an outer radius of 58 mm, pits representing information were formed. A substrate 1D was made in the same manner as the substrate 1C, except that it included pits representing information different from that represented by the pits of the substrate 1C. In each of the substrates 1C and 1D, the part having an inner radius of 20 mm and an outer radius of 58 mm and including the pits was a record region, and part continuous with and inward of the part having an inner radius of 20 mm and an outer radius of 58 mm was a non-record region. The ring-shaped member 8 was located in the non-record region.

Next, reflection layers 3A and 3B were formed as record layers on the substrates 1C and 1D, respectively. In this case, a dual-layer optical disk D2 was formed in the same manner as in the method applied in the first embodiment, except that a metal reflection film formed of Ag alloy was used as the reflection layer 3A, and a metal reflection film formed of AlMo alloy was used as the reflection layer 3B. At this time, an inner circumferential mask having an outside diameter of 36 mm and an outer circumferential mask having an inside diameter of 119 mm were used as well as in the first embodiment. This was intended to provide a larger record region in order to increase the capacity of the disk as much as possible.

When the thickness of the spacer S (i.e., the distance between the reflection layers 3A and 3B) over the entire record region of the substrate was measured, it was 20 µm±1 µm.

As a modification of the second embodiment, a dual-layer optical disk D2' (not shown) was made in the same manner as the optical disk D2, except that it used the modification used an inner circumferential mask having an outside diameter of 23 mm. When the thickness of the spacer S (i.e., the distance between the reflection layers 3A and 3B) over the entire record region of the substrate was measured, it was 20 µm±1 µm.

The third embodiment of the present invention will be explained.

Figure 5:
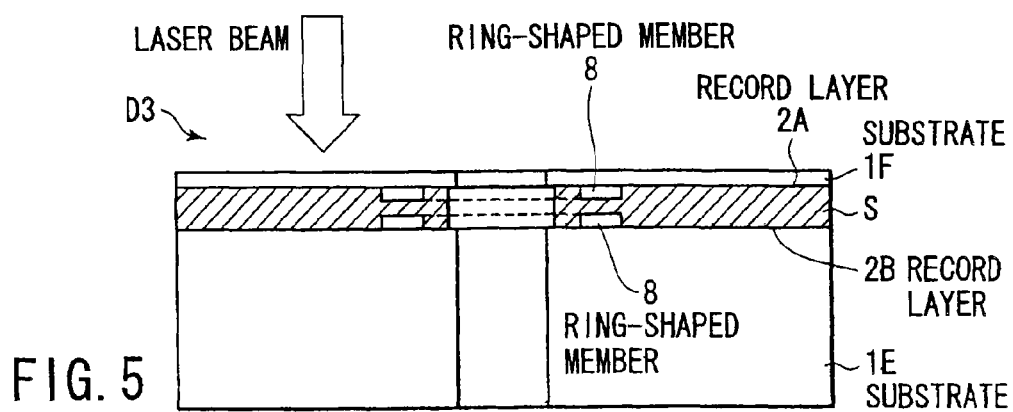
FIG. 5 is a cross-sectional view of an optical disk according to the third embodiment of the present invention.

FIG. 5 is an explanatory view showing a cross section of a dual-layer optical disk D3 according to the third embodiment. The optical disk D3 is a dual-layer disk-RW (rewritable) including a surface cover layer which is transparent and thin.

First, a transparent substrate 1E (formed of polycarbonate and having a diameter of 120 mm and a thickness of 1.1 mm) which had a recess having an outside diameter of 22 mm, a width of 1 mm and a depth of 0.2 mm was prepared, and also a substrate 1F formed of polycarbonate and having a diameter of 120 mm and a thickness of 0.1 mm was prepared. The substrate 1E was different in thickness from the substrate 1A in the first and second embodiments. Part of the substrate 1E which had an inner radius of 20 mm and an outer radius of 58 mm included a groove having information. The substrate 1F included a groove having information differing from that of the groove in the substrate 1E. A record layer 2B was provided on the substrate 1E, and a record layer 2A was provided on the substrate 1F. Except for these points, the dual-layer phase change optical disk D3 was made in the same manner as the optical disk D1.

With respect to the dual-layer phase change optical disk D3, when the thickness of the spacer S (i.e., the distance between the reflection layers 2A and 2B) over the entire record region of the substrate was measured, it was 20 µm±1 µm.

Then, the fourth embodiment of the present invention will be explained.

FIG. 6 is an explanatory view showing a cross section of an optical disk D4 according to the fourth embodiment. The optical disk D4, as well as that in the first embodiment, is a dual-layer phase change optical disk. In the fourth embodiment, ring-shaped members 8 are formed integral with substrates.

First, a transparent substrate 1G (formed of polycarbonate and having a diameter of 120 mm and a thickness of 0.6 mm) which had a recess having an outside diameter of 22 mm, a width of 1 mm and a depth of 0.2 mm was prepared. Part of a substrate 1H which had an inner radius of 20 mm and an outer radius of 58 mm included a groove having information. The information of the groove in the substrate 1H was different from that in a groove in the substrate 1G. On the substrate 1G, a record layer 2A was provided, and on the substrate 1H, a record layer 2B was provided. Except for these points, the dual-layer phase optical disk D4 was made in the same manner as in the first embodiment.

With respect to the dual-layer phase change optical disk D4, when the thickness of the spacer S (i.e., the distance between the reflection layers 2A and 2B) over the entire record region of the substrate was measured, it was 25 µm±1 µm. The height of the ring-shaped member 8 and the thickness of the spacer layer in the dual-layer phase change optical disk D4 were different from those in the optical disk D1, but the above accuracy of the thickness of the spacer S, i.e., an accuracy of ±1 µm, was equal to that in the optical disk D1.

The fifth embodiment of the present invention will be explained.

FIG. 7 is an explanatory view showing a cross section of an optical disk D5 according to the fifth embodiment. The optical disk D5, as well as the disk D1 according to the first embodiment, is a dual-layer phase change optical disk. The disk D5 employs substrates 1A and 1B identical to the substrates 1A and 1B of the disk D1. However, in the disk D5, a ring-shaped member 8 is formed on the substrate 1B only, unlike the disk D1.

In the disk D5, at the time of bonding the substrates 1A and 1B, an ultraviolet curing type resin was dropped the substrate 1B onto part of the substrate 1B which corresponded to a radius of 12 mm, such that the ultraviolet curing type resin was located coaxial with the substrate 1B, and the substrate 1B was spun at 4000 rpm for three seconds such that the surplus part of the ultraviolet curing type resin was removed from the substrate 1B. The substrate 1A provided with the record layer 2A was not coated with the resin. That is, the substrates 1A and 1B were bonded together by using the resin provided on the substrate 1B only. Except for those points, the dual-layer phase change optical disk D5 was made in the same manner as in the first embodiment.

With respect to the dual-layer phase change optical disk D5, when the thickness of the spacer S (i.e., the distance between the reflection layers 2A and 2B) over the entire record region of the substrate was measured, it was 25 µm±2 µm. Even this accuracy, i.e., an accuracy of ±2 µm, satisfies the requirement for the spacers S adopted in next-generation DVDs.

The sixth embodiment of the present invention will be explained.

FIG. 8 is an explanatory view showing a cross section of an optical disk D6 according to the sixth embodiment. The optical disk D6 is a dual-layer phase change optical disk which is formed in the same manner as in the first embodiment, except that the optical disk D6 is formed to include ring-shaped members 8 each having a height of 6 µm.

With respect to the dual-layer phase change optical disk D6, when the thickness of the spacer S (i.e., the distance between the reflection layers 2A and 2B) over the entire record region of the substrate was measured, it was 20 µm ±1 µm.

Each of the above explanations refers to a rewritable phase change record layer as the record layer, which utilizes a phase change which occurs due to radiation of a laser beam, as in a DVD-RAM or a DVD-RW. However, the record layer applicable to the present invention is not limited to the above type of record layer. That is, the present invention can use a record layer containing a pigment which does not allow the reflectivity of the record layer to vary after it varies only one time with irradiation of a laser beam.

Then, comparative examples of dual-layer optical disks will be explained. They are dual-layer optical disks formed in manners different from those of forming the optical disks according to the above embodiments of the present invention.

COMPARATIVE EXAMPLES 1

Figure 9:
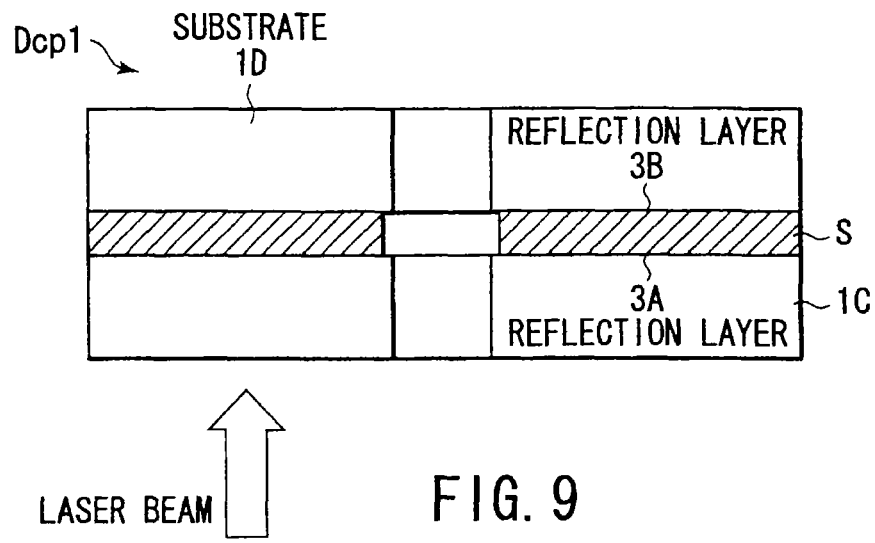
FIG. 9 shows a cross-sectional view of an optical disk as that of a first comparative example which is to be compared with the present invention.

FIG. 9 is an explanatory view showing a cross section of a dual-layer optical disk Dcp1 formed as a comparative example 1.

The dual-layer optical disk Dcp1 was made in the same manner as in the second embodiment of the present invention, except that its substrates were bonded without formation of ring-shaped members 8. Then, with respect to the disk Dcp1, when the thickness of the spacer S (i.e., the distance between the reflection layers 2A and 2B) over the entire record region of the substrate was measured, the thicknesses of parts of the spacer S which were respectively located on parts of the record region of the substrate which corresponded to radii of 25 mm, 40 mm and 55 mm were 18 µm, 24 µm and 26 µm, respectively.

COMPARATIVE EXAMPLE 2

Figure 10:
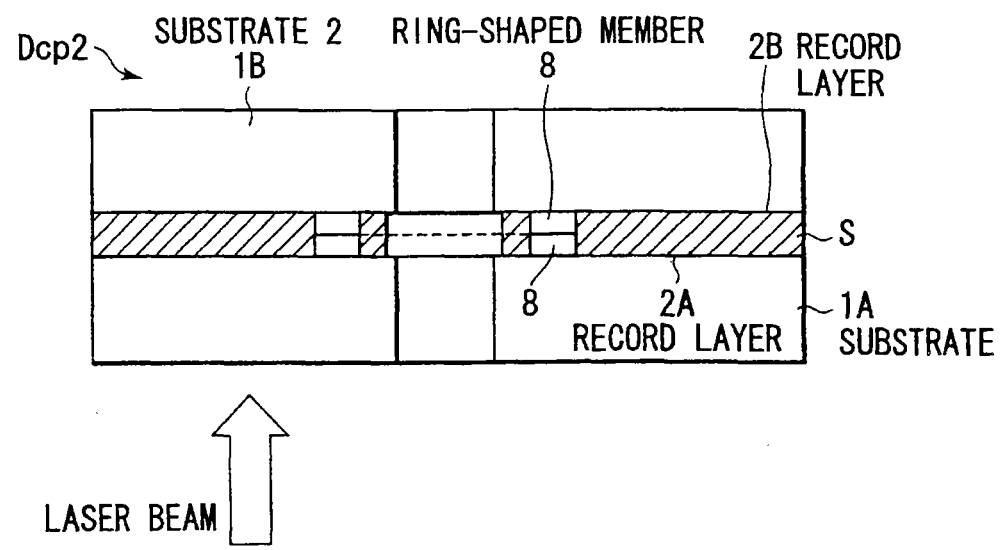
FIG. 10 shows a cross-sectional view of an optical disk as that of a second comparative example which is to be compared with the present invention.

FIG. 10 is an explanatory view showing a cross section of a dual-layer optical disk Dcp2 formed as a comparative example 2.

The dual-layer optical disk Dcp2 was made in the same manner as the optical disk D1, except that it was formed to have ring-shaped members 8 each having a height of 25 µm. With respect to the disk Dcp2, when the thickness of the spacer S (i.e., the distance between reflection layers 3A and 3B) over the entire record region of the substrate was measured, it was 32 µm±15 µm.

As is clear from the above, according to the present invention, in formation of an optical disk provided with two substrates bonded together, an adhesive layer (spacer layer) can be formed to have a substantially uniform thickness over the entire record region on the substrate. That is, the unevenness of the spacer layer between the inner and outer circumferential sides of the optical disk can be reduced, as compared with the conventional method. In addition, when the present invention is applied, the spacer layer can be uniformly formed over the record layer of the disk, without greatly changing production facilities for manufacturing conventional DVDs. Thus, by virtue of the present invention, optical disks each having a high quality and high precision can be easily manufactured.

Additional advantages and modifications will readily occur to those skilled in the art. Therefore, the invention in its broader aspects is not limited to the specific detailed and representative embodiments shown and descried herein. Accordingly, various modifications may be made without departing from the spirit or scope of the general inventive concept as defined by the appended claims and their equivalents. Furthermore, in the present invention, apparatuses and methods can be achieved by appropriately combining structural elements, functions, features and manufacturing steps in the above embodiments.

What is claimed is:

1. An information storage medium comprising:
a substrate;
a first recording layer formed on the substrate;
a spacer formed on the first recording layer;
a second recording layer formed on the spacer; and
a cover layer formed on or over the second recording layer, wherein an optical beam is incident to the information storage medium through the cover layer,
a ring-shaped projection is located radially inward of a recording area, and
the ring-shaped projection is projected from the substrate and in a direction which is opposite to an optical beam incident direction.

* * * * *

UNITED STATES PATENT AND TRADEMARK OFFICE
CERTIFICATE OF CORRECTION

| | | |
|---|---|---|
| PATENT NO. | : 8,603,602 B2 | Page 1 of 1 |
| APPLICATION NO. | : 13/854514 | |
| DATED | : December 10, 2013 | |
| INVENTOR(S) | : Koji Takazawa | |

It is certified that error appears in the above-identified patent and that said Letters Patent is hereby corrected as shown below:

On the title page, Item (54), and in the specifications, Column 1, the Title should read:

--OPTICAL DISK AND METHOD FOR MANUFACTURING THE SAME--

Signed and Sealed this
Twenty-fifth Day of February, 2014

Michelle K. Lee
*Deputy Director of the United States Patent and Trademark Office*